C. GARBER.
PITCHFORK.
APPLICATION FILED MAR. 7, 1916.

1,194,167.  Patented Aug. 8, 1916.

Witnesses

Inventor
C. Garber

Attorney

UNITED STATES PATENT OFFICE.

CHARLES GARBER, OF CLAYTON, OHIO.

PITCHFORK.

1,194,167.  Specification of Letters Patent.  Patented Aug. 8, 1916.

Application filed March 7, 1916. Serial No. 82,695.

*To all whom it may concern:*

Be it known that I, CHARLES GARBER, a citizen of the United States, residing at Clayton, in the county of Montgomery and State of Ohio, have invented certain new and useful Improvements in Pitchforks; and I do hereby declare the following to be a full, clear, and exact description of the invention, such as will enable others skilled in the art to which it appertains to make and use the same.

This invention relates to pitch forks and has for its primary object to provide a device of this character embodying simple and efficient means whereby the curved tines of the pitch fork may be quickly and effectively cleaned of stalks or other substances sticking or clinging thereto.

Figure 1:
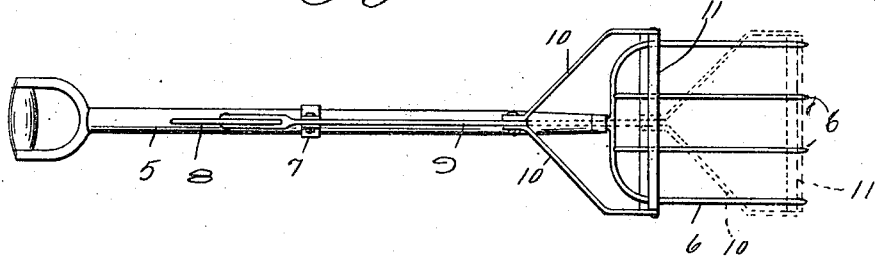
Figure 2:
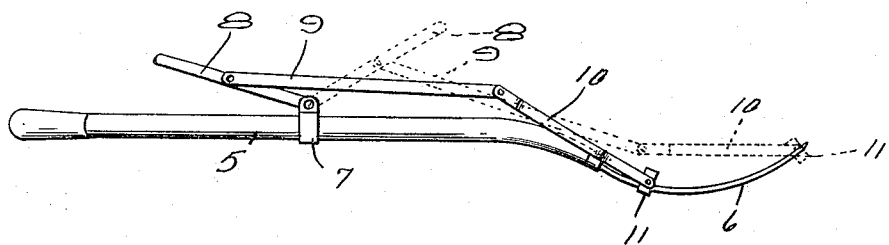
Figure 3:
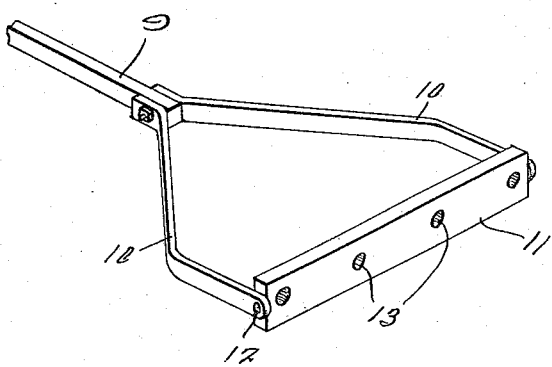
Figure 3:
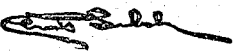
Figure 3:
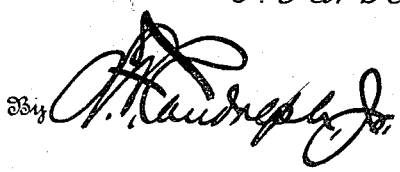

With this and other objects in view, the invention consists in the novel construction, arrangement and formation of parts as will be hereinafter specifically described, claimed and illustrated in the accompanying drawing, in which:

Figure 1 represents a plan view of the improved pitch fork, Fig. 2 represents a side elevation thereof, and Fig. 3 represents a fragmental perspective view of the cleaning device removed from the pitch fork.

Referring to the drawing in detail, wherein similar reference numerals designate corresponding parts throughout the several views, the numeral 5 indicates the stock or handle of the pitch fork carrying the usual elongated curved tines 6. A split ring 7 is secured intermediate the ends of the handle 5 and an operating lever 8 is pivotally secured between the free ends thereof. A connecting rod 9 is pivotally secured at one end to the central portion of the operating lever 8 and is bolted or otherwise secured at its opposite end between the ends of a pair of forwardly diverging arms 10 carried by the cleaner bar 11. A pair of longitudinally projecting pins 12 are rigidly secured in the ends of the cleaner bar 11 and are pivotally mounted in apertures formed in the adjacent parallel portions of the arms 10, whereby the cleaner bar may move relatively to the arms 10 and connecting rod 9.

The cleaner bar 11 is formed with a number of apertures 13 corresponding in number to the number of tines 6 of the pitch fork and each of said openings receives one of the tines.

It is clearly evident from the foregoing that the pitch fork may be used in the usual manner, and when the tines thereof become ineffective in use by the accumulation of stalks, or other substances, sticking or clinging thereto, the lever 8 is moved forwardly or toward the tines 6, thus imparting a longitudinal movement to the connecting rod 9, arms 10, and cleaner bar 11, moving the latter longitudinally of the tines 6 and effectively removing any substances clinging thereto. It is also clearly evident that the bar 11 may turn between the arms 10, as said bar moves forwardly over the curved tines, thereby permitting a snug fit of the tines in the apertures of the cleaner bar and consequently insuring a more thorough and effective cleaning of said tines.

What I claim is:

A pitch fork including a handle, a plurality of curved tines carried thereby, a lever pivotally secured to said handle, a connecting rod pivotally connected with the medial portion of said lever, a pair of forwardly diverging arms secured to said rod and having parallel forward ends arranged on opposite sides of the end tines, a cleaner bar having apertures receiving said curved tines, means pivotally securing said cleaner bar between the parallel forward ends of said arms, whereby said cleaner bar may turn between said arms as it moves longitudinally over said curved tines.

In testimony whereof I affix my signature in presence of two witnesses.

CHARLES GARBER.

Witnesses:
L. A. ALBERT,
BERTHA M. ALBERT.

Copies of this patent may be obtained for five cents each, by addressing the "Commissioner of Patents, Washington, D. C."